W. TREWHELLA.
DOUBLE PINION TOOTHED GEAR TRAIN.
APPLICATION FILED APR. 14, 1908.
940,091.
Patented Nov. 16, 1909.
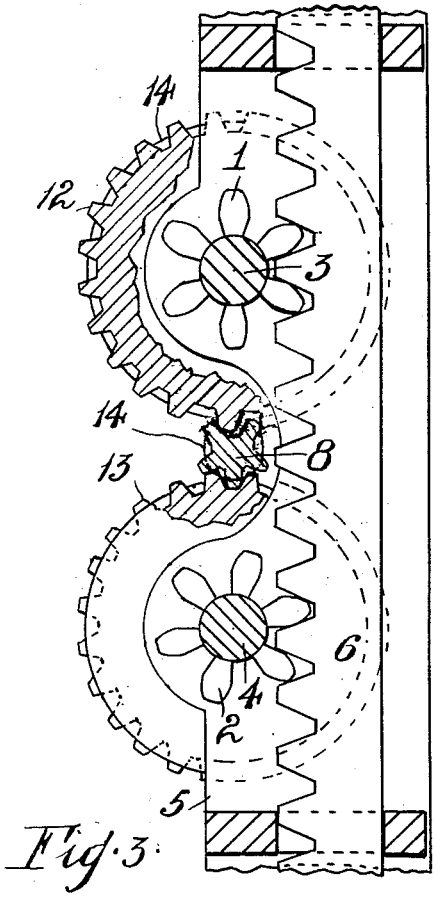
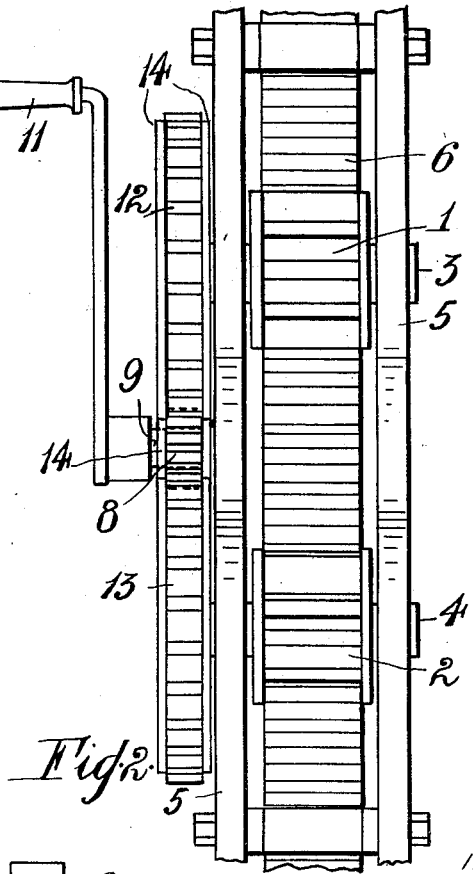
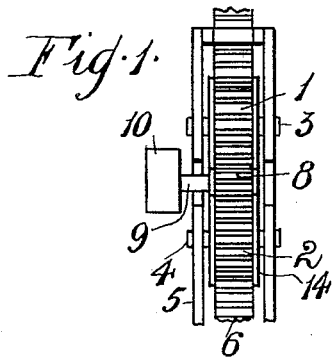
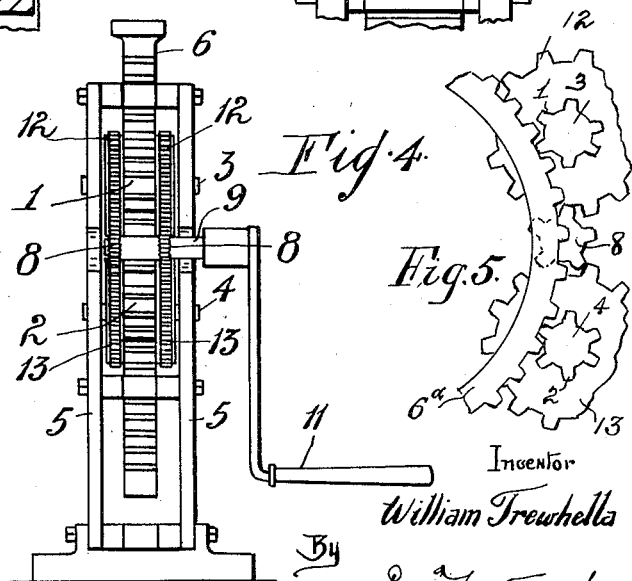
Inventor
William Trewhella

UNITED STATES PATENT OFFICE.

WILLIAM TREWHELLA, OF TRENTHAM, VICTORIA, AUSTRALIA, ASSIGNOR TO HIMSELF AND BENJAMIN TREWHELLA, OF TRENTHAM, AUSTRALIA.

DOUBLE-PINION TOOTHED GEAR-TRAIN.

940,091.　　　　　Specification of Letters Patent.　　Patented Nov. 16, 1909.

Application filed April 14, 1908. Serial No. 427,051.

*To all whom it may concern:*

Be it known that I, WILLIAM TREWHELLA, a subject of the King of Great Britain, residing at Trentham, in the State of Victoria, Commonwealth of Australia, have invented a Double-Pinion Toothed Gear-Train, of which the following is a specification.

This invention comprises a gear train in which the load is equally divided between two sets of gears instead of one as is usual in such mechanism as jacks, cranes and the like, and in which the movement imparted to the driven element is more uniform than is practicable when driving by one gear only.

The invention comprises briefly a floating pinion engaging two pinions geared with a toothed element of any mechanism.

The following drawings comprise various adaptations of the invention.

Figure 1 is a partial front elevation of a device embodying my invention. Figs. 2 and 3 are respectively enlarged front and vertical sectional views of another form of the gear, Fig. 4 an elevation illustrating the application of the invention to a jack, and, Fig. 5 is diagrammatic view of a modification.

According to this invention there are a pair of toothed operative pinions 1, 2, suitably journaled upon separate but parallel axles 3, 4, in a frame or casing 5 which gear either with a toothed element such as a straight rack 6 for lineal motion, or a segmental rack 6ª as shown in Fig. 5. In the simplest form of this train of gear (Fig. 1) the two operating pinions 1, 2, are directly geared with a loose or "floating" pinion 8, the axis 9 of which is normally situated in the same plane with the axles 3, 4, of the operative pinions, but is free to move out of said plane when necessary to conform with slight differences in the relative angular velocities of said operating pinions. Said floating pinion may be rotated by any means such as by a pulley 10 or crank handle 11, and in order to prevent it moving endwise either it or the operative pinions or both may be shrouded as shown. The pinions are preferably half shrouded so that by the shrouds 14 rolling upon each other the floating pinion is maintained equidistant from the axes of the wheels into which it gears. The teeth on this pinion are preferably odd numbered so that the operative pinions engage with the toothed element in opposite phases, and thus effect a steady movement of toothed element to which the gear is applied.

Figs. 2 and 3 show a separate set of teeth or an additional toothed wheel 12, 13, each formed on or integral with the axles of the operative pinions and in such case the floating pinion 8 is geared therewith, by which construction a different leverage is obtained, but the same object is effected as in the simpler form of this gear. In this construction the floating pinion is preferably formed with an even number of teeth and in order to compensate for the irregular angular velocity of gears such as this having few teeth, the operative pinions are spaced more or less than an integral number of pitches apart as in Fig. 3. It will thus be apparent that the engagement of the teeth of one operative pinion occurs in the opposite phase to that of the other, and a steady movement of the toothed element is obtained.

Fig. 4 shows the application of the gear to a jack having a longitudinally sliding rack 6 mounted in the casing 5, and it will be noticed that the toothed wheels 12, 13, formed integral with the axles of the operative pinions are duplicated and that two floating pinions 8, 8, are formed integral on the same axle 9, the object of which is to obtain a more steady and uniform motion though such construction is not essential as the forms of the gear shown in the other three figures of the drawings are equally applicable to this kind of jack.

With the foregoing construction a finer tooth pitch may be utilized than would be practicable were the whole load carried by one set of gears.

It will be observed that instead of the floating pinion 8 being the driving member of the gear train, the pinions 1 and 2 may alternatively be the driving members in which case the pinion 8 would be the driven member.

Having now particularly described and ascertained the nature of my said invention and in what manner the same is to be performed, I declare that what I claim is:—

1. In a train of gearing, a toothed element, a frame therefor, a pair of pinions having parallel axles journaled in the frame and gearing with said element, a toothed wheel fast upon the axle of each pinion, a floating pinion geared with said toothed wheels and having its axis normally in the plane of the axes of the first mentioned pinions but free to move out of said plane to conform with slight differences in the relative angular velocity of said pinions, and means to rotate said floating pinion.

2. In a train of gearing, a frame, a pair of pinions mounted on parallel axles journaled in the frame, a longitudinal rack slidably mounted in the latter, a pair of toothed wheels fixed on the axle of each pinion, and a pair of floating rotatable pinions in axial line gearing with said toothed wheels and arranged so that their axis is normally in the same plane as the axes of said first mentioned pinions but free to move out of said plane to conform with slight differences in the relative angular velocity of said pinions.

In testimony whereof I have hereunto set my hand in presence of two subscribing witnesses.

WILLIAM TREWHELLA.

Witnesses:
EDWARD NEEDHAM WATERS,
WILLIAM GUEST HOLDEN.